United States Patent
Kratochuil et al.

(10) Patent No.: US 8,551,340 B2
(45) Date of Patent: Oct. 8, 2013

(54) METHOD FOR SELECTIVE SULPHATE REMOVAL BY EXCLUSIVE ANION EXCHANGE FROM HARD WATER WASTE STREAMS

(75) Inventors: David Kratochuil, Vancouver (CA); Michael Bratty, Vancouver (CA)

(73) Assignee: Bioteq Environmental Technologies Inc., Vancouver, BC (CA)

( * ) Notice: Subject to any disclaimer, the term of this patent is extended or adjusted under 35 U.S.C. 154(b) by 367 days.

(21) Appl. No.: 12/680,495

(22) PCT Filed: Sep. 25, 2008

(86) PCT No.: PCT/CA2008/001712
§ 371 (c)(1),
(2), (4) Date: Jun. 23, 2010

(87) PCT Pub. No.: WO2009/039655
PCT Pub. Date: Apr. 2, 2009

(65) Prior Publication Data
US 2010/0307972 A1    Dec. 9, 2010

Related U.S. Application Data

(60) Provisional application No. 60/975,462, filed on Sep. 26, 2007.

(51) Int. Cl.
*C02F 1/42* (2006.01)

(52) U.S. Cl.
USPC ............ 210/664; 210/669; 210/677; 210/683

(58) Field of Classification Search
USPC ................. 210/664, 667–669, 670, 683, 685, 210/677
See application file for complete search history.

(56) References Cited

U.S. PATENT DOCUMENTS

| | | | |
|---|---|---|---|
| 2,722,480 A | 11/1955 | Kumar et al. | |
| 2,789,033 A | 4/1957 | Huggins et al. | |
| 4,110,400 A | 8/1978 | Jha et al. | |
| 4,547,347 A | 10/1985 | Lussiez et al. | |

(Continued)

FOREIGN PATENT DOCUMENTS

| WO | 9858737 | 12/1998 |
|---|---|---|
| WO | WO 2010/017652 | 2/2010 |

OTHER PUBLICATIONS

Everett, D.J. et al., "The treatment of underground mine waters for the removal of calcium and sulphates by a GYP-CIX process," International Mine Water Association & Zambia Consolidated Copper Mines Limited: The First African Symposium on Mine Drainage and Environment Protection from Mine Waste Water Dispostal, 1993, pp. 463-491, Chililabombwe (Konkola Division).

(Continued)

*Primary Examiner* — Matthew O Savage
(74) *Attorney, Agent, or Firm* — Knobbe, Martens, Olson & Bear, LLP

(57) ABSTRACT

The invention provides waste water treatment processes utilizing an ion exchange resin to remove sulphate anions, while adjusting the pH of the ion exchange loading solution with carbon dioxide gas. The effect of the resin loading reactions is that dissolved sulphate is replaced with sequestered carbon dioxide gas, in the form of dissolved bicarbonate, in the treated water and the cations are not removed from the solution.

37 Claims, 5 Drawing Sheets

IX Resin Loading in SULF-IXC Process

(56) References Cited

U.S. PATENT DOCUMENTS

| | | |
|---|---|---|
| 4,917,874 A | 4/1990 | Sheth et al. |
| 5,269,936 A | 12/1993 | Gussmann et al. |
| 6,059,974 A | 5/2000 | Scheurman, III |
| 6,852,305 B2 | 2/2005 | Buisman et al. |
| 7,875,186 B2 * | 1/2011 | Coppola et al. ............... 210/677 |
| 2003/0192832 A1 | 10/2003 | Bowers |

OTHER PUBLICATIONS

Robinson et al., "The treatment of acid effluent from the Grootvlei Mine using novel IX techniques," Journal—South African Institute of Mining and Metallurgy, 1998, vol. 98, No. 7, pp. 343-352.

International Search Report dated Dec. 31, 2008 issued for PCT/CA2008/001712.

Huisman, J. et al., Biologically produced sulphide for purification of process streams, effluent treatment and recovery of metals in the metal and mining industry, Hydrometallurgy, 2006, vol. 83, pp. 106-113.

BioteQ Environmental Technologies Inc., Annual Report, 2001, 30 pages.

Buisman, Cees J.N., Sulphur and sulphate reduction with acetate and propionate in an aerobic process for sulphide removal, Applied Microbiology and Biotechnology, 1989, vol. 32, pp. 363-370.

Caiqiao, Yin et al., Treatment of solution from atmospheric sulfuric acid leaching of ocean polymetallic nodules, Beijing General Research Institute of Mining and Metallurgy, Beijing, China.

International Network for Acid Prevention: Treatment of sulphate in mine effluents, Lorax Environmental, Oct. 2003, pp. 129 pages.

Office Action dated Nov. 12, 2010, issued in connection with Australian Application No. 2007234313.

Robinson, R.E. et al., The treatment of acid effluent from the Grootvlei Mine using novel IX techniques.

Robinson, R.E., The Amanzi concept for acid mine drainage, Science in Africa, May 2003.

Schoeman, J.J. et al., Investigation into alternative water treatment technologies for the treatment of underground mine water discharged by Grootvlei Proprietary Mines Ltd into the Blesbokspruit in South Africa, Desalination, 2001, vol. 133, pp. 13-30.

Wurts, William A. et al., Interactions of pH, carbon dioxide, alkalinity and hardness in fish ponds, Southern Regional Aquaculture Center Publication, Dec. 1992, Issue 464.

* cited by examiner

METHOD FOR SELECTIVE SULPHATE REMOVAL BY EXCLUSIVE ANION EXCHANGE FROM HARD WATER WASTE STREAMS

This application is U.S. National Phase of International Application PCT/CA2008/001712, filed Sep. 25, 2008 designating the U.S., and published in English as WO 2009/039655 on Apr. 2, 2009, which claims priority to U.S. Provisional Application No. 60/975,462 filed Sep. 26, 2007.

FIELD OF THE INVENTION

The invention is in the field of wastewater treatment processes, in particular processes utilizing anion exchange resins to remove sulphate anions.

BACKGROUND OF THE INVENTION

A variety of industrial processes produce water and wastewater streams that have relatively high concentrations of dissolved species. Accordingly, in many jurisdictions, regulations proscribe limits on the concentrations of particular species in wastewater, as well as on the total concentration of water born compounds in wastewaters. This latter criteria is often expressed as a limit on "total dissolved solids" (TDS). For example, in the United States, the Environmental Protection Agency has established National Secondary Drinking Water Regulations that set water quality standards, in the form of "secondary maximum contaminant levels", for drinking water. These include a guideline maximum sulphate concentration of 250 mg/L and a maximum TDS of 500 mg/L. Other regulations in the United States proscribe limits on the TDS of fresh water to be used for agriculture of 1,000 mg/L and a TDS limit of 1,500 mg/L for fresh water to be used in fresh water aquaculture.

Acid mine drainage constitutes one category of wastewater that often requires treatment in order to meet regulatory discharge standards. For example, a variety of neutralization processes may be used for treating acidic mine drainage, using limestone ($CaCO_3$), hydrated lime ($Ca(OH)_2$) and/or quicklime (CaO) as neutralization agents. In these lime treatment processes, sufficient alkalinity is typically added to raise pH and thereby to form insoluble metal hydroxides that settle out of the water while the predominant anion, sulphate, precipitates as gypsum ($CaSO_4 \cdot 2H_2O$) or gypsum anhydrite ($CaSO_4$). While drastically reducing the concentration of some species, particularly heavy metals, these processes may produce wastewaters that have very high residual calcium and/or magnesium cation concentrations, i.e. hard water, as well as high concentrations of sulphate anions. The effluent dissolved calcium and sulphate concentrations are controlled by the solubility of the gypsum species, which is theoretically approximately 2.6 g/L $CaSO_4 \cdot 2H_2O$ but which varies considerably depending on the other ions in the water and on the concentrations of ions fed to the lime treatment process. Effluents from these lime neutralization plants may, for example, be characterized by the following parameters: pH 6 to 10.5; $SO_4^{2-}$ 1,000 to 2,200 mg/L; $Ca^{2+}$ 400 to 800 mg/L; and $Mg^{2+}$ 0 to 500 mg/L. Other anions such as $NO_3^-$, $Cl^-$, and $HCO_3^-$ may for example be present in the range of 0 to 500 mg/L. Other cations, such as $Na^+$, $K^+$, $NH_4^+$, may for example be present in the range of 0 to 500 mg/L. Bleed streams from flue gas desulphurization scrubbing circuits may also produce aqueous effluents that are relatively hard, with $Mg^{2+}$ of 3500 mg/L, $Ca^{2+}$ of 400 to 2000 mg/L, and $SO_4^{2-}$ of 1000 to 5000 mg/L. There may accordingly be a need for further treatment, following lime treatment, of these waters to meet particular discharge, or re-use, requirements.

A very wide variety of processes have been used to remove ionic species from water, primarily for the treatment of industrial wastewaters and the purification of drinking water. Cation and anion exchange resins have for example been used together in circuits adapted for the treatment of mine waters high in calcium and sulphate (see: U.S. Pat. No. 5,269,936; International Patent Publication No. WO/1998/058737; Everett, D. J., Du Plessis, J. & Gussman, H. W. (1993): The Treatment of Underground Mine Waters for the Removal of Calcium and Sulphates by a GYP-CIX Process.—In: International Mine Water Association & Zambia Consolidated Copper Mines Limited: The First African Symposium on Mine Drainage and Environment Protection from Mine Waste Water Disposal.—p. 463-491; Chililabombwe (Konkola Division); The treatment of acid effluent from the Grootvlei Mine using novel IX techniques. Robinson, R. E. Barnard, R. Le Riche, F. J., JOURNAL-SOUTH AFRICAN INSTITUTE OF MINING AND METALLURGY 1998, VOL 98; NUMBER 7, pages 343-352. Conventionally, sulphuric acid and lime are used to regenerate the cation and anion exchange resins in these processes, to produce gypsum (calcium sulfate dihydrate, CaSO4.2H2O) as a solid by-product of resin regeneration. The cost of the regeneration process inputs, as well as the costs of dealing with the associated regeneration products, may represent a significant proportion of the total operating costs of such processes. Anion exchange resins have also been used, without a preceding step of cation removal, to soften water by first removing anions, such as sulphate, with a concomitant increase in pH that is utilized to precipitate calcium carbonate (U.S. Pat. No. 6,059,974). Carbon dioxide may be used in this process, to facilitate calcium carbonate precipitation. Carbon dioxide is soluble in water, with which it reacts to form a balance of several ionic and non-ionic species: dissolved free carbon dioxide ($CO_2$ (aq)), carbonic acid ($H_2CO_3$), bicarbonate anions ($HCO_3^-$) and carbonate anions ($CO_3^{2-}$), in equilibrium as follows:

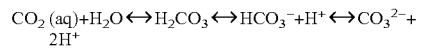

$$CO_2\,(aq) + H_2O \leftrightarrow H_2CO_3 \leftrightarrow HCO_3^- + H^+ \leftrightarrow CO_3^{2-} + 2H^+$$

A high pH will push this equilibrium towards carbonate formation, and hence facilitate the precipitation of calcium carbonate.

SUMMARY OF THE INVENTION

In various aspects, the present invention provides processes for anion exchange treatments of hard water solutions laden with dissolved sulphate. To minimize the precipitation of calcium carbonate scale during resin treatment, processes of the invention utilize carbon dioxide gas to control pH. Process parameters may be adjusted to facilitate sulphate loading onto the anion exchange resin, while passing high concentrations of calcium and bicarbonate ions through in the treated water. In this way, processes of the invention may be used to reduce the sulphate concentration in a wastewater stream, and to sequester carbon dioxide gas, while avoiding calcium carbonate formation, and scaling of the anion resin.

In selected embodiments of the invention, anion exchange resins that have been loaded with sulphate from a wastewater stream may be regenerated for later reuse by treatment with a solution or slurry containing lime and/or caustic solution, to produce a calcium sulphate (gypsum) solid and a liquid regenerant solution. A regeneration circuit may be adapted to recirculate a high proportion of the liquid regenerant, to improve the material handling and cost efficiencies of the overall processes of the invention. The lime may be applied either directly to the column during regeneration, or in the preparation of the regenerant solution, or both. When used in the column in regeneration of anion exchange resins, lime may be selected based on advantageous particle size parameters, in part to ameliorate the effects of gypsum fouling of the resin and to ensure that the resin bed is free of solids following regeneration, prior to loading.

In selected embodiments of the invention, the recovery and recycle of caustic solution could be enhanced by utilizing a combination of a separate resin contactor containing cation resin and a membrane unit process such as nanofiltration or reverse osmosis. The use of the cation resin facilitates the production of NaOH from $Na_2SO_4$ when $Ca(OH)_2$ is used as the source of the hydroxide ($OH^-$) groups. The membrane process increases the concentration of caustic in the recycled solution stream.

In particular embodiments, the invention provides methods for selective removal of sulphate anions from aqueous solutions bearing calcium cations. The methods may include, but are not limited to, the steps of:
(a) contacting a wastewater stream with an anion exchange resin, to form a resin loading solution, wherein:
  (i) the wastewater has an initial dissolved sulfate concentration that is higher than a desired discharge sulfate concentration (for example wherein the initial dissolved sulfate concentration is equal to or lower than the saturated concentration of sulfate as gypsum in the wastewater);
  (ii) the dissolved sulfate is the major anion requiring treatment in the wastewater, for example comprising at least 50% of the total anions to be removed from the wastewater;
  (iii) the pH of the wastewater is 6 to 12 (for example wastewater resulting from the treatment of acid mine drainage with lime, or a flue gas desulfurization wastewater);
(b) treating the resin loading solution with a carbon dioxide gas stream so that the pH of the resin loading solution is maintained below a contacting pH of 9.5 while sulphate anions are loaded onto the resin in exchange for hydroxyl anions, to produce a treated water stream and a loaded resin, wherein:
  (i) the treated water stream has a lower dissolved $SO_4^{2-}$ concentration than the wastewater stream, and the sulfate removed is replaced (on an equivalent basis, expressed for example as meq/L) by either bicarbonates or carbonates;
  (ii) the amount of dissolved calcium in the effluent is equal to the amount of dissolved calcium in the feed, less the amount, if any, that precipitates and is removed as calcium carbonate solids (the amounts of dissolved magnesium and sodium in the effluent may be equal to the amounts in the feed); and,
  (iii) The quantity of sulfate as solid gypsum produced through the regeneration of the anion exchange resin is roughly equal to the amount of sulfate removed in the loading process, plus the amount, if any, of sulfate added to the regenerant solution as sodium sulfate; and optionally,
(c) pretreating the solution by contacting it with a cation exchange resin wherein:
  (i) Calcium, magnesium and other cations may be removed, releasing protons into solution which assist with the operation of the anion exchange resin;
  (ii) The cation exchange resin may be regenerated using sulfuric acid to produce gypsum
  (iii) The cation exchange resin may be of the strong acid cationic (SAC), or a weak acid cationic (WAC) type
  (iv) The solution may be stripped of dissolved carbon dioxide gas (if present in the feed) at a pH below 6.0 or preferably below 4.0 in a gas-liquid contactor inserted between the cation and anion stages by blowing atmospheric air through the solution
  (v) The regenerant solution may be recycled through the addition of sulfuric acid, the precipitation of gypsum, and the separation of the solids produced from the regenerant solution
  (vi) The resin may be rinsed with a solution of ammonia following regeneration, particularly for the case where a WAC resin is used
  (vii) Magnesium may be removed from the regenerant solution by neutralizing the solution, precipitating magnesium hydroxide, and separating the precipitated solids from the solution

DETAILED DESCRIPTION OF THE INVENTION

Figure 1:
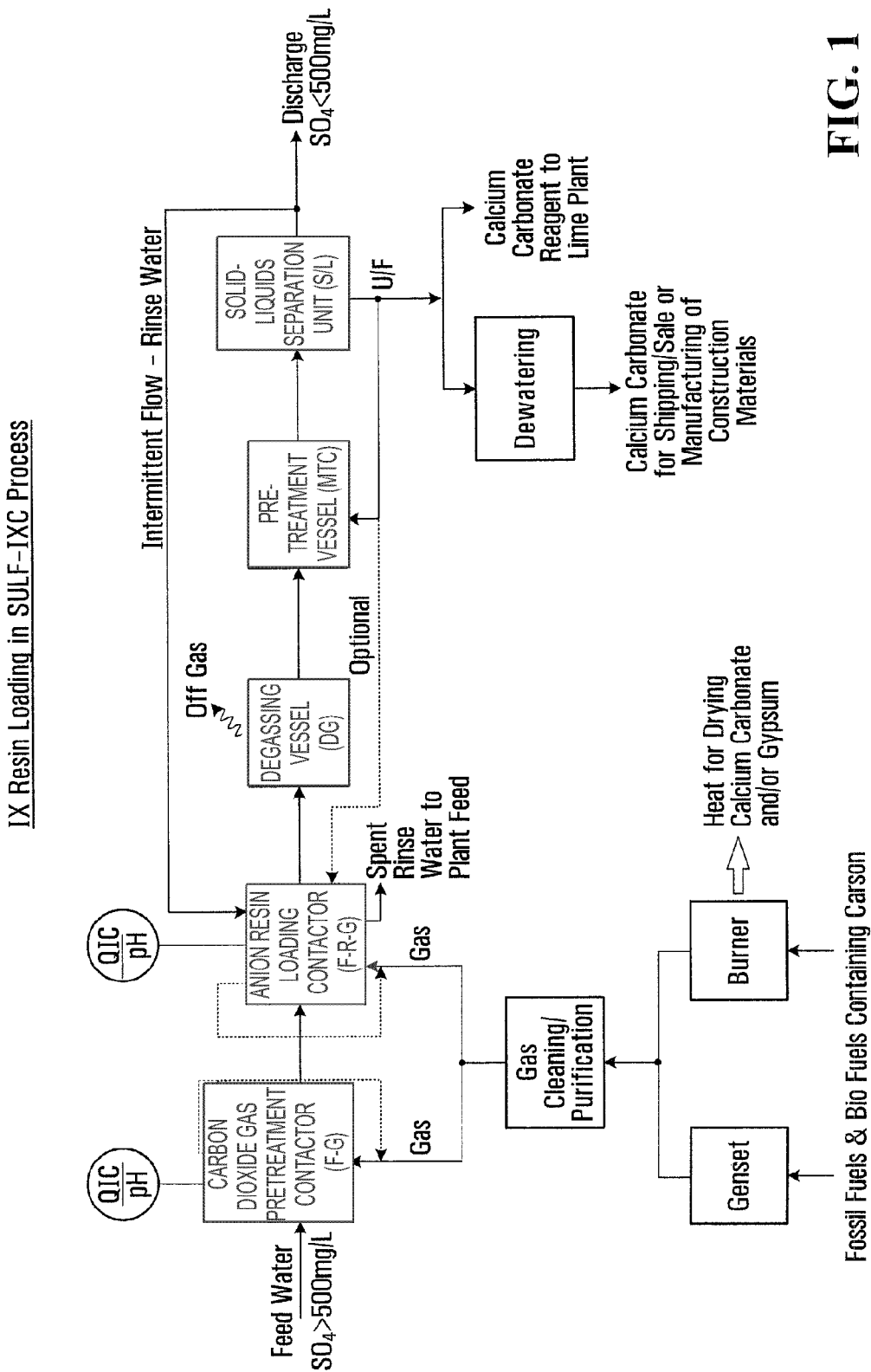
FIG. 1 is a process flow sheet illustrating anion exchange treatment of a wastewater stream to exchange dissolved sulphate in the stream for bicarbonate in the treated water using carbon dioxide to control pH during loading of the anion exchange resin.

In various aspects, the invention provides anion exchange processes for the removal of sulphate from wastewater rich in sulphate and hardness (and hence having a high scaling potential). As such, wastewater streams for treatment in various aspects of the invention may be characterized by ionic concentrations that present particular challenges for cost effective wastewater treatment systems. For example, wastewater streams may be treated that contain Ca2+, Mg2+, and SO42− as the predominant ionic species dissolved. In some embodiments, the concentration of dissolved sulphate may be in the vicinity of 1500 mg/L, which is the typical solubility limit of sulfate in the form of the mineral gypsum di-hydrate. In some wastewaters, such as flue gas desulfurization effluent, the sulphate level may be higher due to the presence of other species in the water such as anti-scaling compounds and chloride. In other wastewaters, such as acid mine drainage, the sulfate level may be lower depending on the conditions of the formation of the acid mine drainage. Particularly in the case of these wastewaters, the dissolved SO42− may account for a high proportion, such as at least 50% to over 90%, of the total weight of all anions dissolved in the water. Similarly, dissolved Ca2+ and Mg2+ together may account for at least 50% of the total weight of all cations dissolved in the water. The pH of the wastewater streams treated in accordance with alternative embodiments may, for example, be within a particular range, such as pH 6 to 11. Where dissolved sodium (Na+−) is present in the wastewater, sulfate removal will be effected with a concomitant release of sodium bicarbonate and sodium carbonate to the effluent.

In selected embodiments, effluents from lime neutralization plants may be treated with processes of the invention and create synergies with such plants. These effluents may for example be characterized by the following parameters: pH 6 to 10.5; $SO_4^{2-}$ 1,000 to 2,500 mg/L; $Ca^{2+}$ 400 to 800 mg/L; $Mg^{2+}$ 0 to 500 mg/L. Other anions, such as $NO_3^-$, $Cl^-$, and $HCO_3^-$ may also be present, for example in the range of 0 to 500 mg/L. Other cations, such as $Na^+$, $K^+$, $NH_4^+$, may be present, for example in the range of 0 to 500 mg/L. Low levels of metals, such as $Zn^{2+}$ and $Mn^{2+}$, may also be present in concentrations of less than 100 mg/L. In accordance with alternative embodiments, bleed streams from flue gas desulphurization scrubbing circuits may be treated with processes of the invention. These bleed streams may for example be characterized by the following parameters: $Mg^{2+}$ of 3500 mg/L; $Ca^{2+}$ of 400 to 2000 mg/L; and, $SO_4^{2-}$ of 1000 to 5000 mg/L.

In one aspect of the invention, wastewater rich in sulphate is brought into contact with $CO_2$ gas and an anion exchange resin. A wide variety of anion exchange resins may be used in alternative embodiments of the invention. In selected embodiments, strong base anion resins such as Sybron Lewatit M500 are preferred over weak base anion resins. In some embodiments, strong anion resins in a gel form with a moderate to high degree of cross-linking and low moisture content are preferred. In some embodiments, an anion exchange resin with a narrow particle size distribution is preferred, to assist with the control of resin loss and to ensure that precipitate solids are flushed from the bed prior during part of the treatment cycle. In particular embodiments, only one anion exchange resin is required for sulfate removal. The type of anionic resin selected for use in the invention may in part be based on the selection of the pH setpoint value for the loading phase of processes of the invention which depends in part on the feed water and discharge objectives. Strong base anionic resins will generally be amenable to use at a wide range of pH setpoints, up to 9.5, while weakly basic anionic resins will generally be limited to use at pH less than 6. The process may utilize only one type of anionic resin, or a mixture of two or more anionic resins.

Loading of the resin can generally be performed under a wide range of temperatures, and pressures, including embodiments carried out at ambient atmospheric pressure and at the ambient temperature of the wastewater stream entering the process. Low temperature limits for processes of the invention are generally governed by the freezing temperature of the fluids involved, such as the freezing point of the feed wastewater solution. In general, high temperature limits for various process stages are dictated by the sensitivity of the ion exchange resin to thermal degradation.

The contact between the anion exchange resin and the wastewater stream to be treated may, for example, take place in one contactor vessel as shown in FIG. 1, or in a several vessels operating in parallel or in sequence. The number of contacting vessels may be varied depending, for example, on the flow rate of the feed water, the sulphate concentration in the feed water, and the loading capacity of the particular resin for the sulfate anions.

In various aspects of the invention, resin loading reactions can be summarized as follows:

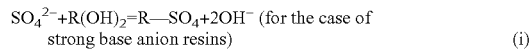

$SO_4^{2-}+R(OH)_2=R\!-\!\!-\!SO_4+2OH^-$ (for the case of strong base anion resins) (i)

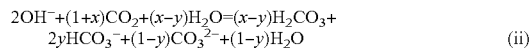

$2OH^-+(1+x)CO_2+(x-y)H_2O=(x-y)H_2CO_3+2yHCO_3^-+(1-y)CO_3^{2-}+(1-y)H_2O$ (ii)

Where $x>0$ and $0\leq y\leq 1$ and the actual values of x and y are determined by the pH setpoint in the contactor vessel(s). In selected embodiments, at a contacting pH greater than 8.0, and particularly if the pH is over 9.5, calcium carbonate will precipitate as a result of the increase in pH caused by loading of the anion exchange resin with sulphate and the addition of $CO_2$, if the ion $Ca^{2+}$ is present in the wastewater feed, according to the following reaction:

$(1-y)CO_3^{2-}+(1-y)Ca^{2+}=(1-y)CaCO_3$ (iii)

Accordingly, in various aspects of the invention, sulphate present in the feed wastewater is exchanged for bicarbonate that reports to the discharge treated water stream. The quantity of solid $CaCO_3$ formed may be modulated by controlling pH during resin loading.

As is discussed in more detail below, the anion exchange resin loaded with sulphate may be regenerated using a solution or slurry of lime, gypsum and/or caustic soda. In some embodiments, a portion of the treated water discharged after sulphate loading may be used for rinsing the regenerated resin prior to initiating the next loading cycle. In selected embodiments, the sulphate concentration in the discharge will meet a particular sulphate discharge limit, such as less than 500, 250, 50 mg/L $SO_4$ or such limits as set by a regulating authority or water reuse constraints. The resin regeneration reactions can be summarized as follows:

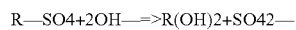

$R\!-\!\!SO4+2OH\!-\!\!-\!\!=\!\!>R(OH)2+SO42\!-\!\!-$

For the case of strong base anionic resins, the regeneration reaction may take place in the presence of lime and/or gypsum solids particles.

In some embodiments, the regenerant stream is split between the early part of the regenerant flow, containing higher levels of sodium sulfate and lower levels of sodium hydroxide, and the later part the stream, which contains higher levels of sodium hydroxide.

In alternative embodiments, $CO_2$ may be added to the wastewater stream either upstream of the reactor containing the anion exchange resin, and/or directly into the reactor containing the resin. $CO_2$ may be added so as to maintain the pH of the resin loading solution at a predetermined value, such as less than about 9.5, or so as to maintain the pH of the resin loading solution within a selected range, such as pH 4 to 9.5, or 6 to 9.5. Unused (unreacted) $CO_2$ may optionally be recycled, as shown in FIG. 1. In selected embodiments, a low limit for the partial pressure of $CO_2$ may be selected, such as 0.01, 0.02, 0.03, 0.04, 0.05 or 0.1 mbar.

Carbon dioxide gas for use in alternative embodiments of the invention may be derived from a variety of sources, for example from anthropomorphic sources such as the combustion of fossil fuels, or other fuels containing organic carbon.

In some embodiments, process of the invention may be operated in conjunction with lime treatment plants, with which there may be some operating synergies. For example, processes of the invention may use the same source of alkali for regenerating the anion exchange resin as is used in the lime plant, i.e. lime. Calcium carbonate generated in processes of the invention, derived for example from solid/liquid separation steps downstream of the wastewater-resin contactor, may be used to neutralize acidity in a lime plant operating upstream of the processes of the invention. Sludge from a lime plant typically comprising metal hydroxides and gypsum may be blended with solid by-products generated by processes of the invention, for example to produce construction material.

In some embodiments, cations may be removed in advance of the anion exchange process by contacting the feed water with a strong acid cationic (SAC) resin as follows:

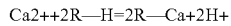

Ca2++2R—H=2R—Ca+2H+

For the case of strong acid cationic resins. The resins may be regenerated according to:

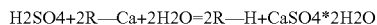

H2SO4+2R—Ca+2H2O=2R—H+CaSO4*2H2O

Where gypsum (usually as di-hydrate) will precipitate. Acid is added to replace that which is lost. The gypsum solids are separated from the regenerant solution and may be disposed of or sold.

In some embodiments, the precipitated gypsum is classified by particle size and recycled to the regeneration process to assist in the prevention of scaling on the resin.

In some embodiments, the cation circuit may be operated as a single resin loading stage and the resin may be regenerated in the same vessel that loading takes place by sequencing the operation of successive resin columns or operating in a batch treatment mode.

In some embodiments, magnesium may be removed from the cation stage regenerant solution by neutralizing the solution to precipitate magnesium hydroxide, separating the solid from the liquid, then recycling the liquid to the process.

In some embodiments, depending on the contacting pH, the treated water discharged from the resin-loading contactor (F-R-G) may be passed through a degassing vessel (DG) where residual $CO_2$ and/or other gases are allowed to off-gas from the treated water. In some embodiments, particles of solid $CaCO_3$ may remain suspended in the treated water discharged from the resin-loading contactor (F-R-G), passing through the degassing vessel (DG), to be removed from the treated water in a solid-liquid separation step (S/L) if necessary. In these embodiments, the S-L overflow stream provides the treated process effluent, which may be characterized by particular dissolved $SO_4$ levels, such as less than 500 mg/L, and by a particular pH, such as less than 9.5. In some embodiments, the treated process effluent may be discharged into the environment. In some embodiments, a portion of the underflow (U/F) from the solid-liquid separation step (S-L) downstream of the resin-loading contactor (F-R-G) may be recycled to a pretreatment (MTC) step upstream of the resin-loading contactor (F-R-G) or to the resin-loading contactor (F-R-G). In some embodiments, this recycling of calcium carbonate solids may be managed so as to assist in the formation of, and control of particle size of, calcium carbonate. The pretreatment step (MTC) may, for example, take place in a vessel that is a simple agitated tank.

The design of the resin-loading contactor vessel(s) (F-R-G) will generally be dependent upon the hydraulic loading of the process, the sulphate concentration in the feed water, the loading capacity of the resin, and the sulphate concentration limit to be met in the process discharge. Contacting vessels may for example include fluidized beds, columns, pump cells, or gas lift reactors with carbon dioxide gas introduced via spargers or eductors and optional gas recycle. For embodiments utilizing fluidized beds, the specific hydraulic loading or regeneration could be 16 $m^3$ per $m^2$ per hour or a value determined by the physical characteristics of the particular resin employed. Screens or toher separators may be employed in the resin contactor overflow point to retain the resin particles. The wastewater stream may be pretreated in a carbon dioxide gas pretreatment step (F-G), to adjust the pH of the wastewater stream. The carbon dioxide gas pretreatment contactors (F-G) may for example be sparged mixed reactors or eductors, with optional gas recycle.

Processes of the invention do not generally require a pure $CO_2$ stream to be used in order to achieve high treatment efficiency. Low grade $CO_2$ streams such as waste gas streams or off-gas generated by combustion of fuels containing organic carbon (fossil and biofuels) may for example be used. Heat generated from combustion processes may also be used in processes of the invention, for example to dry the solid by-products of the invention, for example to produce construction materials such as gypsum wall board from the solid by-products of resin regeneration. In selected embodiments, carbon dioxide containing gas streams for use in the invention may be scrubbed before use in the invention. For example, the carbon dioxide containing off-gas from combustion of fuels containing organic carbon may be passed through a gas cleaning stage, where impurities such as particulates or volatile substances may be removed.

In various embodiments, anion exchange resin regeneration is accomplished by treatment of the loaded resin with an alkali, which may for example be lime, or mixtures of lime and sodium sulphate, or mixtures of lime and caustic soda (NaOH), or caustic soda alone. When lime is used, sulfate removed from the feed water is converted into one or more forms of solid $CaSO_4$ including $CaSO_4$, $CaSO_4.0.5H_2O$, and/or $CaSO_4.2H_2O$.

Figure 2A:
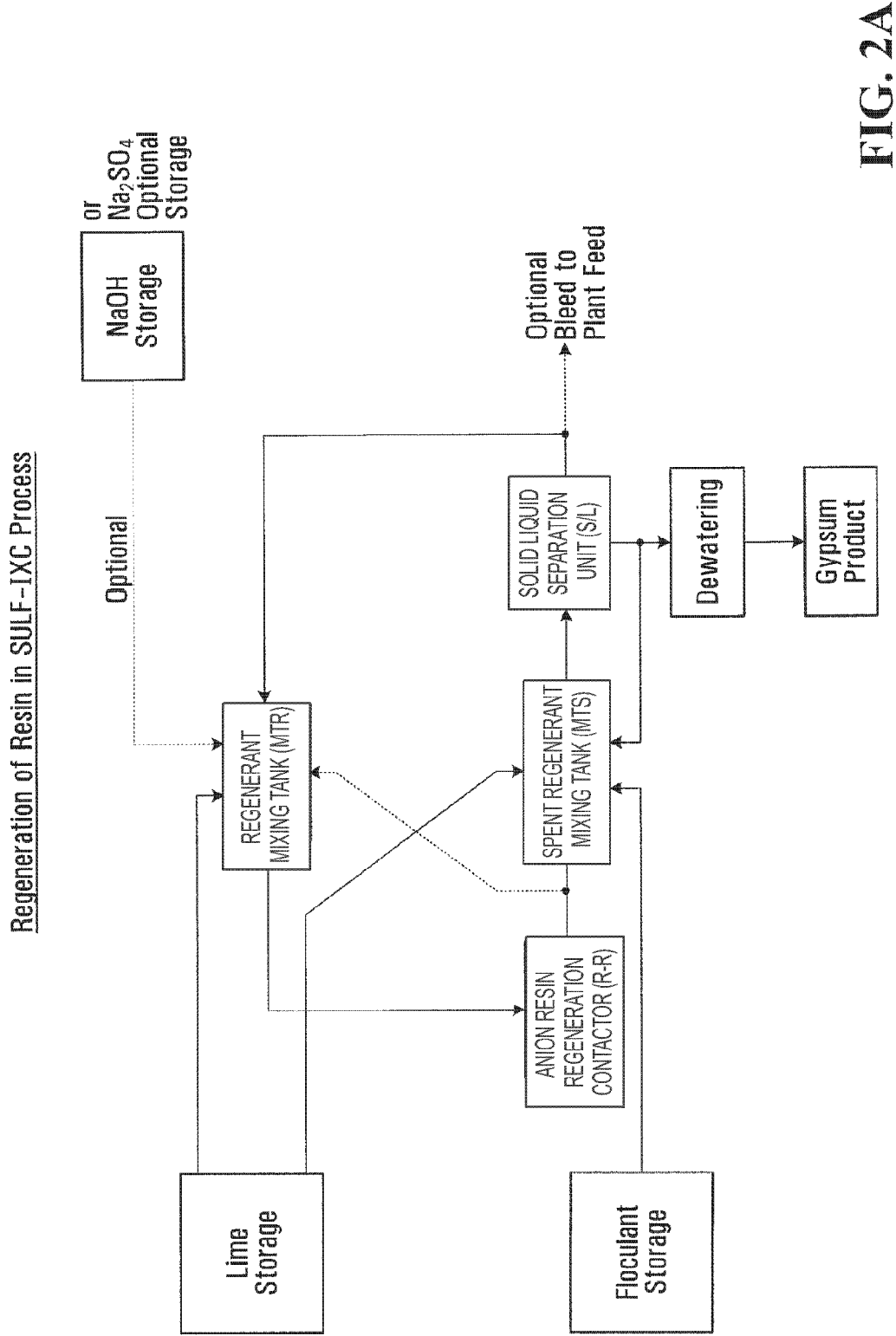
FIG. 2a is a process flow sheet illustrating regeneration of the anion exchange resin loaded in accordance with the process illustrated in FIG. 1, with lime treatment of the loaded resin to produce a solid gypsum by-product.

In selected embodiments, the use of lime in the process, with the concomitant precipitation of gypsum solids, allows the resin regeneration stage to be designed as a circuit in which a proportion, such as at least 50 to 100%, of the spent regenerant solution, discharged from the resin regeneration (R-R) contactor, is recycled to the resin regeneration (R-R) contactor. This is illustrated in FIG. 2a, as the regeneration circuit involving the MTS, S/L, and MTR vessels The MTS vessel (or vessels) is used for mixing and decanting spent regenerant and the MTR vessel(s) is used for mixing the transfer of regenerated solution. MTS stands for mixing tank (with solids) and MTR stands for mixing tank (regenerant solution only). R-R stands for resin regenerating tank and S/L stands for solids-liquids separation vessel. Lime and optionally also $Na_2SO_4$ or NaOH are added to the MTR vessel for a final adjustment of pH, $SO_4^{2-}$ level, and $Na^+$ level in the regenerant prior to resin regeneration. When caustic soda is used in the process of the invention, a small bleed stream of the spent regenerant may be directed from the overflow of the S/L unit to the plant feed. In this way, sodium sulphate (or caustic soda as an option) may be used as the source of sodium ($Na^+$) ions that in effect act as the carrier for $OH^-$ ions in the regeneration circuit. The process may be adapted to minimize consumption of $Na^+$ in the regeneration process, i.e. to minimize its loss to dewatering and the solid by-products of the regeneration process. Sodium is lost from the circuit via the rinse water which passes from the regeneration contactor to the feed, which is then passed through the loading column to the effluent. Sodium loss is controlled by adjusting the rinse duration and the resin cycling. Consequently, in some embodiments, a sodium salt, such as $Na_2SO_4$ or NaOH, may be introduced into the process during the first fill or initial charge of the regeneration circuit, with very small continuous additions required only to make up for $Na^+$ losses resulting from resin rinse procedures. In general the regenerant solution should be managed to provide a $OH^-$ concentration of at least 0.1 mol/L, for embodiments using strong base anion resins. The maximum concentration of caustic in the regenerant solution should not exceed the limit specified by resin manufacturers such as for example 6% NaOH (1.6 mol/L).

In selected embodiments, a relatively constant level of $SO_4^{2-}$ is maintained in the recycled regenerant by the addition of lime and optionally also of gypsum seed to the spent regenerant. Regenerant solution pH, conductivity, and/or direct $SO_4^{2-}$ assays may be used for monitoring and controlling the rate of lime addition to the spent regenerant. Similarly, a relatively constant level of $Na^+$ may be maintained in the regenerant by the addition of NaOH and/or $Na_2SO_4$. Regenerant solution pH, conductivity, and/or direct $Na^+$ assays can be used for controlling the rate of addition of NaOH and/or $Na_2SO_4$ to the spent regenerant. In selected embodiments, prior to the reuse of the recycled regenerant, the regenerant may be adapted to contain: at least 0.5 g/L $Na^+$, preferably more than 10 g/L $Na^+$ but no more than 150 g/L $Na^+$; $SO_4^{2-}$ concentration lower than 3 g/L but preferably lower than 2.2 g/L.

In some embodiments, the regenerant solution passes through a separate vessel (not shown) where lime is added to the regenerant to precipitate gypsum and produce NaOH. Some or all of the precipitated gypsum may then be removed from the regenerant solution. The amount and particle size distribution of solid gypsum in the regenerant may be controlled to prevent scaling of the resin beads during regeneration.

In some embodiments, a portion of the stream exiting the R-R vessel during resin regeneration and rinsing can be directed to MTR thus by-pass MTS and S/L separation. This bypass reduces the size of MTS and S/L and increases the extent of reaction between lime and spent regenerant in MTS.

In some embodiments, up to 100% of the volume of the spent regenerant may be recycled, to increase the overall water recovery of the sulfate removal process. Rates of precipitation and particle size may be modulated with the use of recycle streams from solid-liquid separation units located downstream of the contactors and regenerators, and by the mechanical design and sizing of the solid-liquid separation units.

Figure 2B:
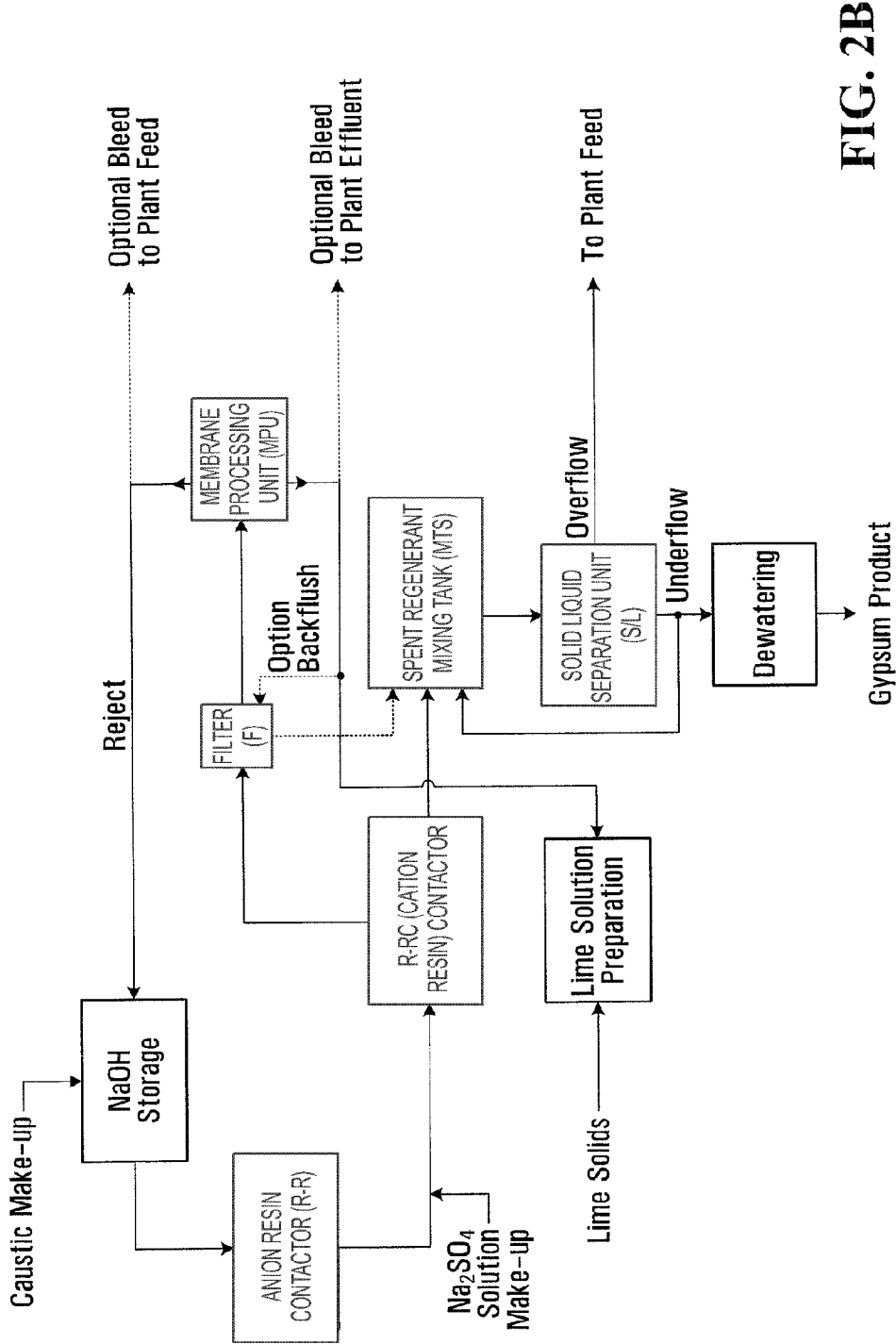
FIG. 2b is a process flow sheet illustrating regeneration of the anion exchange resin loaded in accordance with the process illustrated in FIG. 1, with caustic treatment of the loaded resin including enhanced caustic recovery by utilizing cation exchange resin to produce a solid gypsum by-product and caustic stream, and a membrane unit to increase the caustic solution concentration in the caustic recycle stream.

In some embodiments, the recovery and recycle of NaOH may be enhanced by utilizing a cation exchange resin, and in some embodiments the recovery and recycle of NaOH may be enhanced by utilizing both a cation exchange resin and a membrane process unit (MPU). This is illustrated in FIG. 2b. If the MPU unit is bypassed, then the volume of the flow in the recovery circuit is higher. The anion resin loaded with sulphate resides in the contactor R-R and is regenerated with the solution of NaOH. The strength of the NaOH solution should be at least 0.05 mol/L. The discharge from the R-R contactor reports to a cation resin contactor R-RC where Na is captured by the cation resin in exchange for calcium that is released from the resin and subsequently reacted with sulphate stripped from the anion resin to form gypsum. The stream containing gypsum exits the R-RC contactor and is directed to MTS and subsequently to the solid-liquid separation unit S/L. A portion of the underflow stream from the solid-liquid separation may be recycled to MTS to promote the growth of gypsum particles. The overflow from the S/L is directed to the plant feed. The cation exchange resin that is placed in the vessel denoted as R-RC is regenerated, i.e. converted from the Na-form back to the Ca-form, using lime solution prepared in the lime make-up circuit. As lime solution passes through the cation resin, Na is released into solution in exchange for Ca. The caustic stream exiting R-RC is directed to the membrane process unit MPU via a filter unit F. The filter unit captures lime and/or gypsum particles that maybe present in the stream exiting R-RC during the resin conversion to the Ca-form. The MPU produces two streams including the "permeate" (depleted of sodium) and "reject" (containing the majority of sodium present in the feed to the MPU). The permeate stream is recirculated to the lime preparation step. A portion of the permeate could be mixed with the plant effluent and subsequently discharged into the environment. The reject stream is largely recirculated to the caustic storage for re-use in the regeneration of the anion resin used for removing sulphate from the feed water. A portion of the reject stream could be directed to the plant feed. Losses of sodium and/or caustic from the alkali regenerant solution used regenerating the anion resin in residing in R-R through process streams shown in FIG. 2b are to off-set by the addition of caustic to the NaOH storage and/or addition of concentrated $Na_2SO_4$ solution to the stream entering R-RC contactor containing the cation exchange resin in Ca-form. The cation exchange resin placed in the R-RC vessel could be either strong or weak acid cation exchange resin although weak acid cation resin is preferred. The filter unit F could be either a cartridge filter with prescribed pore size of minimum 5 micron and maximum 50 micron and/or conventional multimedia filter followed by cartridge filter. If a multimedia filter is used upstream of cartridge filter, a portion of the permeate stream shall be used as the filter backflush water. The spent backflush stream laden with solids dislodged from the multimedia filter during backflush shall report to MTS.

In selected embodiments, the resin is passed from the loading column to the regeneration column and back. In alternative embodiments, the resin remains in one column, which alternately receives either feed or regenerant solution. In embodiments that employ two or more different vessels for loading and regeneration of the resin, the resin is transferred back and forth between the resin-loading (F-R-G) vessel(s) and resin-regeneration (R-R) vessel(s) as the resin undergoes consecutive cycles of loading and regeneration. The spent regenerant discharged from the resin-regeneration contactor (R-R) reports to the "MTS" stage where it is mixed with lime, and optionally also with: $Na_2SO_4$ or NaOH, underflow from the "S/L" stage, and flocculent solution. The MTS stage may be composed of one or more agitated tanks, with multiple tanks operating in series. The discharge from MTS reports to the "S/L" unit. As illustrated in FIG. 2, solids that settle in the "S-L" vessel, generally gypsum and possibly also calcium carbonate, may be pumped in a slurry form for dewatering. Dewatering of by-product solids may for example utilize conventional filtration equipment. In some embodiments, a small portion of the liquid "S/L" overflow stream may be bled from the process to modulate process chemistry, particularly if NaOH is used as one of the reagents in the regeneration circuit.

Figure 3:
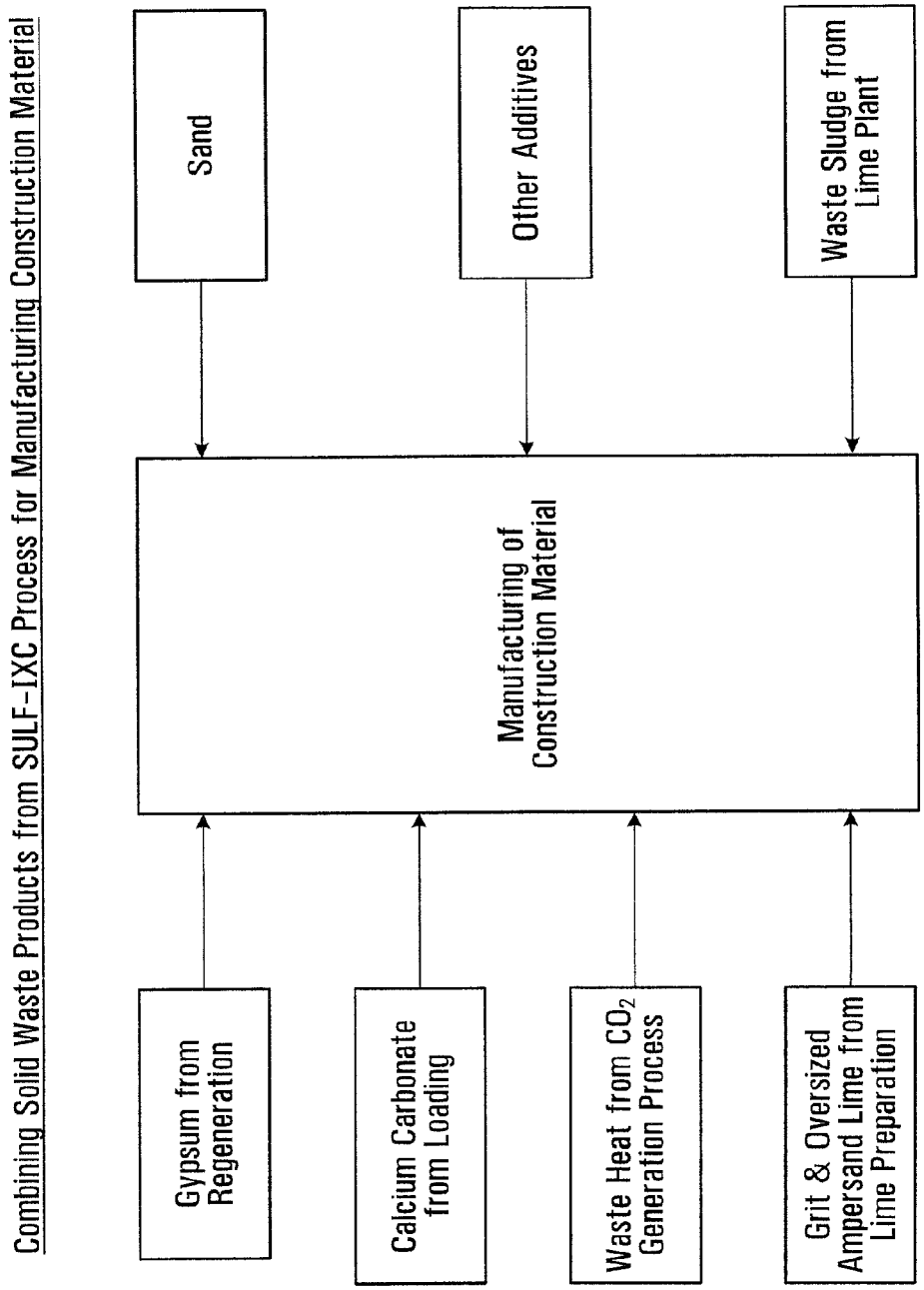
FIG. 3 is a schematic illustration summarizing how some of the products of the processes illustrated in FIGS. 1 and 2 may be utilized to produce construction materials.
Figure 4:
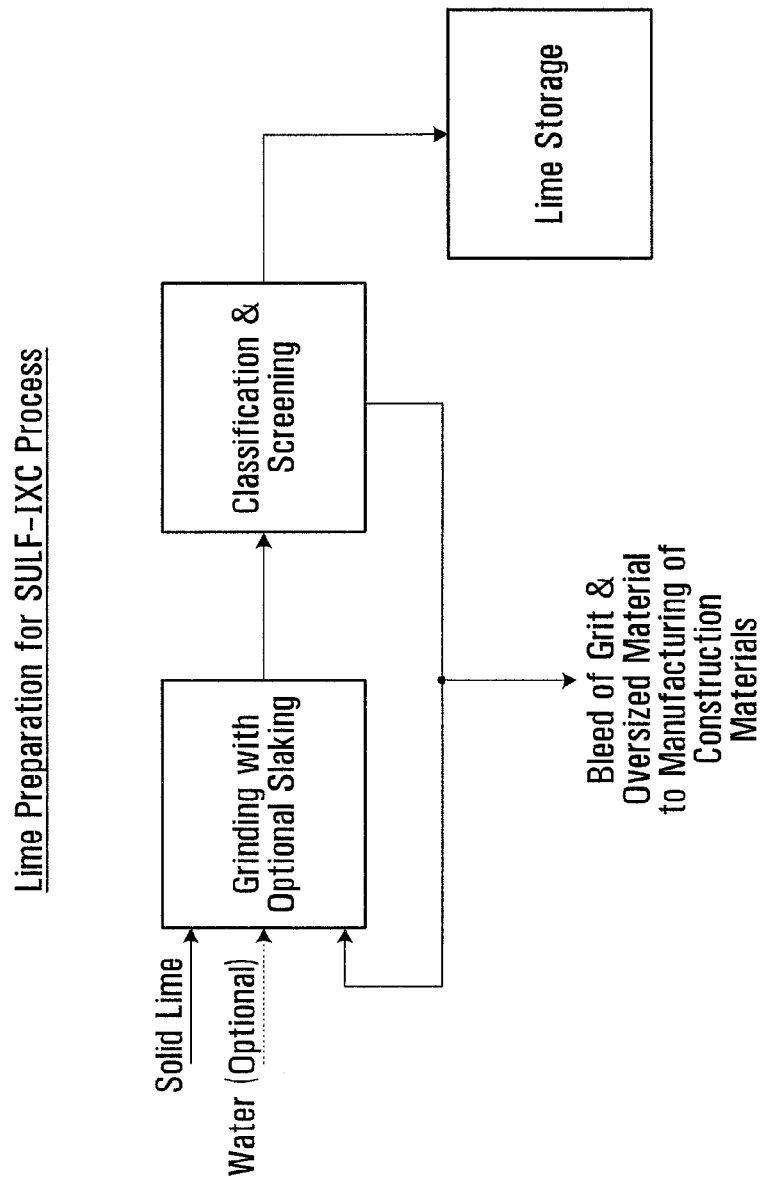
FIG. 4 is a process flow sheet illustrating steps in the preparation of lime for use in the resin regeneration process illustrated in FIG. 2.

In alternative embodiments, hydrated lime ($Ca(OH)_2$) or quick lime (CaO) or both, may be used as the raw consumables in the process of the invention. In some embodiments, the lime feed stock may undergo size reduction and/or slaking in a closed loop grinding/slaking circuit, which may for example include hydroclassifiers and/or a number of screening stages for particle size control (as illustrated in FIG. 4). Oversized lime and grit material may be bled from the closed loop and may be subsequently blended with gypsum formed during resin regeneration (as illustrated in FIG. 3). In some embodiments, the lime feed stock utilized in the processes of the invention may be a fine lime kiln dust, as is commonly generated and collected during the manufacturing of CaO from $CaCO_3$.

In some embodiments, two solid by-products are formed in processes of the invention. A relatively small quantity of calcium carbonate may be produce during loading of the anion exchange resin, and a larger quantity of gypsum will be produced during regeneration of the resin. A variety of other solid by-products may be generated by the processes of the invention, for example oversized lime and grit from the lime preparation circuit. The solid by-products of the invention may for example be used as feedstocks to a number of subsequent processes, including but not limited to: building materials (such as drywall wall products, bricks, highway dividers and other construction material); acid water neutralization reagents ($CaCO_3$); and, fillers and pigments for papermaking (precipitated $CaCO_3$). For example, $CaCO_3$ produced by processes of the invention may be used directly in an acid water neutralization process, such as a lime treatment, upstream of the processes of the invention. In alternative embodiments, waste heat, for example from $CO_2$ generation/combustion process, may be used in manufacturing processes linked to the processes of the invention, for example to dry the solid by-products of the processes of the invention, or to dry sludge generated in a lime plant upstream of the processes of the invention, for example to produce bricks, concrete dividers, and/or dry wall products.

In some embodiments, the solid by-products of resin regeneration may be used to manufacture construction materials, such as gypsum wall boards, to minimize the waste produced by the overall processes of the invention. In some embodiments, processes of the invention may be carried out downstream of lime treatment plants, and the solid by-products of the lime treatment plants may be combined with the solid by-products of the processes of the invention, to implement an integrated treatment system for wastewater rich in sulfate, hardness, and metals.

In some embodiments, particularly when processes of the invention operate at a pH greater than about 6.5, process equipment may be fabricated from mild steel.

In one aspect of the invention, solid gypsum forms in the regeneration circuit by reaction between $Ca^{2+}$ present in the regenerant and $SO_4^{2-}$ stripped from the resin. This supersaturation of gypsum has the potential to lead to fouling of the active surfaces of the anion exchange resin, and hence to a reduction in the efficiency of the processes of the invention. Should gypsum particles get trapped and subsequently grow inside the bed of the resin, the capacity of the ion exchange resin to load sulfate from the feed stream would diminish. The formation of gypsum scale on the surface of the resin beads, or walls of the reactor containing the resin, and/or walls of tanks and pipes comprising the regeneration circuit could also negatively impact the efficiency and operating costs of the processes of the invention. Accordingly, the invention provides methods for ameliorating these risks, by employing one or more of the following processes: reducing the delay between regeneration and rinsing of the resin; fluidizing the resin in the reactor during regeneration and rinsing using an upflow with superficial velocities greater than 1.5 m/hr, preferentially greater than 10 m/hr, and as high as 25 m/hr; controlling the particle size of gypsum and/or the tonnage of gypsum that is allowed to enter the reactor containing resin during regeneration, for example by using clarifiers, screens, hydrocyclones, and/or hydroclassifiers in the "S/L" processing stage. In accordance with the latter process, the "S/L" stage may be designed to prevent gypsum particles with terminal settling velocity greater than 0.2 m/hr, and preferably greater than 2 m/hr, from reporting to vessel "MTR" and subsequently being reused in the process. In addition, the mass flux of gypsum reporting to the "MTR" vessel may be controlled by controlling the seed recycle to MTS vessel and the solids residence time of gypsum in the process, for example by adopting a bleeding schedule.

Should lime or gypsum particles get trapped inside the bed of the resin during regeneration, the capacity of the ion exchange resin to load sulfate from the feed stream would be reduced and potentially cease to exist. Furthermore, trapped lime may cause an uncontrolled formation of $CaCO_3$ in the resin bed during loading which could potentially lead to resin blinding. Accordingly, the invention provides methods for ameliorating these risks, by employing one or more of the following processes: pH control to pH less than about 8 during anion exchange resin loading; reducing the length of any delay between regeneration and rinsing of the resin; screening of lime prior to adding lime to the regeneration circuit, or grinding of lime, to yield material having a P80 particle size (i.e. 80% of particles are smaller than) of 100 micron. In this latter aspect of the process, the grinding may for example be undertaken in either an open loop or closed loop grinding circuit, for example using conventional grinding equipment. In selected embodiments, a closed loop lime grinding circuit may yield improved control over the lime particle size. In an alternative aspect of the invention, rejected or oversized lime particles may either be reground in a closed loop circuit, or directed to a lime plant operating upstream of the processes of the invention. Alternatively, oversize lime particles may be blended into a gypsum product.

In one aspect, processes of the invention may operate synergistically with coal burning power plants which generate wastewater from flue gas desulfurization processes. This wastewater generally contains sulfate at, or above, the theoretical level for gypsum saturation. In the resin loading stage of the process of the invention, the $CO_2$ from the burning of coal may be utilized, so that a portion of the $CO_2$ from the coal plant is sequestered in the form of dissolved bicarbonate in treated waters produced by processes of the invention. Also, waste heat from the power plant may be recycled to assist in the production of building materials from the solid waste generated by the processes of the invention.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification are incorporated herein by reference as if each individual publication were specifically and individually indicated to be incorporated by reference herein and as though fully set forth herein. The invention includes all embodiments and variations substantially as hereinbefore described and with reference to the examples and drawings.

What is claimed is:

1. A method for selective removal of sulfate anions from aqueous solutions bearing calcium cations, the method comprising:

(a) contacting a wastewater stream with an anion exchange resin in a reactor, to form a resin loading solution, wherein:
   i) the wastewater has an initial dissolved sulfate concentration that is higher than a desired discharge sulfate concentration, wherein the initial dissolved sulfate concentration is equal to or lower than the saturated concentration of sulfate as gypsum in the wastewater;
   ii) the dissolved sulfate is a major anion requiring treatment in the wastewater comprising at least 50% of the total anions requiring treatment in the wastewater;
   iii) the pH of the wastewater is in the range of 6 to 12; and,
(b) adding carbon dioxide to the wastewater stream upstream of the reactor or in the reactor so as to treat the resin loading solution with a carbon dioxide gas stream so that the pH of the resin loading solution is maintained below a contacting pH of 9.5 while sulfate anions are loaded onto the resin in exchange for hydroxyl anions, to produce a treated water stream and a loaded resin, wherein:
   (i) the treated water stream has a lower dissolved sulfate concentration than the wastewater stream and the sulfate removed is stoichiometrically replaced by bicarbonates or carbonates, said bicarbonates or carbonates generated from a reaction between carbon dioxide, hydroxyl anions, and water;
   (ii) an amount of dissolved calcium in the treated water stream is equal to the amount of dissolved calcium in the wastewater, less the amount that precipitates and is removed as calcium carbonate solids; and,
   (iii) amounts of dissolved magnesium and dissolved sodium in the treated water stream are substantially equal to respective amounts of dissolved magnesium and dissolved sodium in the wastewater;
wherein the anion exchange resin is a strongly basic anion exchange resin.

2. The method of claim 1, wherein the wastewater has a dissolved sulfate concentration that is higher than about 500 mg/L and less than about 1500 mg/L.

3. The method of claim 1, wherein the pH of the resin loading solution is maintained within the range of pH 6 to 9.5.

4. The method of claim 1, wherein the anion exchange resin is a gel form with a moderate to high degree of cross-linking and a low moisture content.

5. The method of claim 1, wherein the carbon dioxide is an anthropogenic carbon dioxide from combustion of a fossil fuel.

6. The method of claim 1, wherein a calcium carbonate precipitate is produced in the resin loading solution and present in the treated water stream.

7. The method of claim 6, further comprising the step of separating the calcium carbonate precipitate from the treated water stream.

8. The method of claim 1, further comprising the step of regenerating the loaded resin by removing the sulfate loaded on the resin, to provide the anion exchange resin for the contacting step.

9. The method of claim 8, wherein the step of regenerating the loaded resin comprises treating the loaded resin with an alkali regenerant, to exchange hydroxyl anions for the sulfate anions on the loaded resin.

10. The method of claim 9, wherein the alkali regenerant is selected from the group consisting of a solution of sodium hydroxide, a lime slurry, and mixtures thereof.

11. The method of claim 10, wherein more than 90% of the regenerant comprising the lime slurry is comprised of solid calcium hydroxide in a particulate form having a P80 particle size of 100 microns.

12. The method of claim 10, wherein more than 90% of the regenerant comprising the lime slurry is comprised of solid calcium hydroxide in a particulate form having a P80 particle size of 5 microns.

13. The method of claim 10, wherein a spent regenerant produced in the step of regenerating by the loaded resin is directed to a contactor containing a cation exchange resin, and wherein sodium is loaded onto the cation exchange resin and sulfate present in solution in the contactor reacts with calcium released from the cation exchange resin to yield solid gypsum.

14. The method of claim 13, further comprising the step of converting the cation exchange resin back to a Ca-form with a solution or slurry of lime.

15. The method of claim 13, wherein the step of converting the cation exchange resin back to the Ca-form is carried out so as to yield a solution of sodium hydroxide.

16. The method of claim 15, wherein residual lime or gypsum solids are removed from the sodium hydroxide solution.

17. The method of claim 15, further comprising directing the sodium hydroxide solution to a membrane process unit for nanofiltration or reverse osmosis.

18. The method of claim 17, wherein at least 75% of a reject stream from the membrane process is recirculated to the step of regenerating the loaded resin, and the reject stream contains the majority of sodium entering the membrane process unit.

19. The method of claim 17, wherein at least 99% of a reject stream from the membrane process is recirculated to the step of regenerating the loaded resin, and the reject stream contains the majority of sodium entering the membrane process unit.

20. The method of claim 17, wherein at least 75% of a permeate stream from the membrane process unit is recirculated and used to prepare a lime solution or a lime slurry, and wherein the permeate stream is depleted of sodium by treatment in the membrane process unit.

21. The method of claim 17, wherein at least 99% of a permeate stream from the membrane process unit is recirculated and used to prepare a lime solution or a lime slurry, and wherein the permeate stream is depleted of sodium by treatment in the membrane process unit.

22. The method of claim 13, wherein the cation exchange resin is a gel form resin with a moderate to high degree of cross-linking.

23. The method of claim 8, wherein the step of regenerating the loaded resin produces a solid sulfate by-product from the sulfate loaded on the resin, in combination with a spent liquid regenerant solution.

24. The method of claim 23, wherein a stoichiometric amount of sulfate produced as the solid sulfate by-product is approximately equivalent to the stoichiometric amount of sulfate removed in the step of treating the resin loading solution, plus the stoichiometric amount, if any, of sulfate added to the alkali regenerant.

25. The method of claim 23, further comprising the step of separating the spent liquid regenerant solution from the solid sulfate by-product.

26. The method of claim 25, further comprising recirculating the spent liquid regenerant solution to the step of regenerating the loaded resin.

27. The method of claim 26, wherein at least 75% of the spent liquid regenerant solution is recirculated to the step of regenerating the loaded resin.

28. The method of claim 26, wherein a portion of the spent liquid regenerant solution is recirculated to the step of regenerating the loaded resin without intermediate steps of lime addition or solid-liquid separation.

29. The method of claim 26, wherein at least 99% of the spent liquid regenerant solution is recirculated to the step of regenerating the loaded resin.

30. The method of claim 1, further comprising the step of pretreating the solution to exchange cations for protons using a strong acid cationic or weak acid cationic resin.

31. The method of claim 30 whereby the resin is regenerated using sulfuric acid to produce a solution of gypsum and sulfuric acid.

32. The method of claim 30 where the resin is rinsed after regeneration with ammonia and the feed cations are exchanged for ammonium ions.

33. The method of claim 31 whereby the gypsum is precipitated, separated from the solutions, and the regenerant solution is recycled.

34. The method of claim 30, where the effluent of the cation stage is stripped of carbon dioxide in a gas-liquid contactor.

35. The method of claim 31, where the pH of the feed to the stripping stage is below 6.0.

36. The method of claim 34, where the pH of the feed to the stripping stage is below 4.0.

37. The method of claim 1, wherein the waster water is resultant from treatment of acid mine drainage with lime or flue gas desulfurization wastewater.

* * * * *

UNITED STATES PATENT AND TRADEMARK OFFICE
CERTIFICATE OF CORRECTION

| | |
|---|---|
| PATENT NO. | : 8,551,340 B2 |
| APPLICATION NO. | : 12/680495 |
| DATED | : October 8, 2013 |
| INVENTOR(S) | : David Kratochuil et al. |

It is certified that error appears in the above-identified patent and that said Letters Patent is hereby corrected as shown below:

Title Page (Item 56), Col. 2, Line 16, under Other Publications change "Dispostal," to --Disposal,--.

In the Specification

Column 3, Line 67, change "gypsum" to --gypsum,--.

Column 4, Line 2, change "type" to --type,--.

Column 4, Line 7, change "solution" to --solution,--.

Column 4, Line 11, change "solution" to --solution,--.

Column 4, Line 14, change "used" to --used,--.

Column 4, Line 18, change "solution" to --solution,--.

In the Claims

Column 15, Line 27, in Claim 36, change "claim 34," to --claim 32,--.

Signed and Sealed this
Eighth Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,551,340 B2
APPLICATION NO. : 12/680495
DATED : October 8, 2013
INVENTOR(S) : Bratty Page 1 of 1

It is certified that error appears in the above-identified patent and that said Letters Patent is hereby corrected as shown below:

Title Page

Item (12) delete, "Kratochuil", and insert -- Bratty --.

Item (75) replace first inventor "David Kratochuil" with -- Michael Bratty --.

Item (75) enter "David Kratochuil" as second inventor.

Signed and Sealed this
Eighteenth Day of November, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,551,340 B2 | Page 1 of 1 |
| APPLICATION NO. | : 12/680495 | |
| DATED | : October 8, 2013 | |
| INVENTOR(S) | : Michael Bratty | |

It is certified that error appears in the above-identified patent and that said Letters Patent is hereby corrected as shown below:

Title Page, Item (75) Inventors, change "Kratochuil" to --Kratochvil--.

Signed and Sealed this
Thirty-first Day of March, 2015

Michelle K. Lee
*Director of the United States Patent and Trademark Office*